United States Patent [19]

Kerklies

[11] 4,253,344
[45] Mar. 3, 1981

[54] SPROCKET DRUM ASSEMBLY

[75] Inventor: Bodo Kerklies, Lunen, Fed. Rep. of Germany

[73] Assignee: Gewerkschaft Eisenhutte Westfalia, Lunen, Fed. Rep. of Germany

[21] Appl. No.: 30,571

[22] Filed: Apr. 16, 1979

[30] Foreign Application Priority Data

Apr. 24, 1978 [DE] Fed. Rep. of Germany ....... 2817968

[51] Int. Cl.³ ............................................. F16H 55/30
[52] U.S. Cl. .................................... 474/96; 29/159.2; 29/463; 29/526 R; 474/102
[58] Field of Search ......... 74/243 R, 243 H, 243 DR, 74/434, 437, 594.2, 447, 448, 450, 230.11, 230.13; 226/76; 29/159 R, 159.2, 463, 526 R

[56] References Cited

U.S. PATENT DOCUMENTS

| | | |
|---|---|---|
| 596,947 | 1/1898 | Scholfield ........................ 74/450 X |
| 750,910 | 2/1904 | Townsend ........................ 74/450 |
| 2,429,008 | 10/1947 | Wolfe ........................ 74/450 X |
| 3,106,101 | 10/1963 | Harriman ........................ 74/450 X |
| 3,319,413 | 5/1967 | Costner ........................ 74/450 X |
| 4,043,214 | 8/1977 | Westlake ........................ 74/450 X |

FOREIGN PATENT DOCUMENTS

| | | | |
|---|---|---|---|
| 964398 | 5/1957 | Fed. Rep. of Germany | ........ 74/243 R |
| 2340318 | 2/1975 | Fed. Rep. of Germany | . |
| 237603 | 10/1925 | United Kingdom | ...................... 74/450 |

Primary Examiner—C. J. Husar
Assistant Examiner—Moshe I. Cohen
Attorney, Agent, or Firm—Sughrue, Rothwell, Mion, Zinn and Macpeak

[57] ABSTRACT

A sprocket drum assembly is constituted by two complementary, radially-separable sprocket drum assembly parts. The assembly comprises a hollow, cylindrical drum and a sprocket wheel having an odd number of sprocket teeth. The two assembly parts meet along two surfaces. The inner edges of at least those portions of said surfaces associated with the drum lie in a diametrical plane of the assembly. Each of the outer edges of those portions of said surfaces associated with the sprocket wheel lie between a respective pair of sprocket teeth.

6 Claims, 3 Drawing Figures

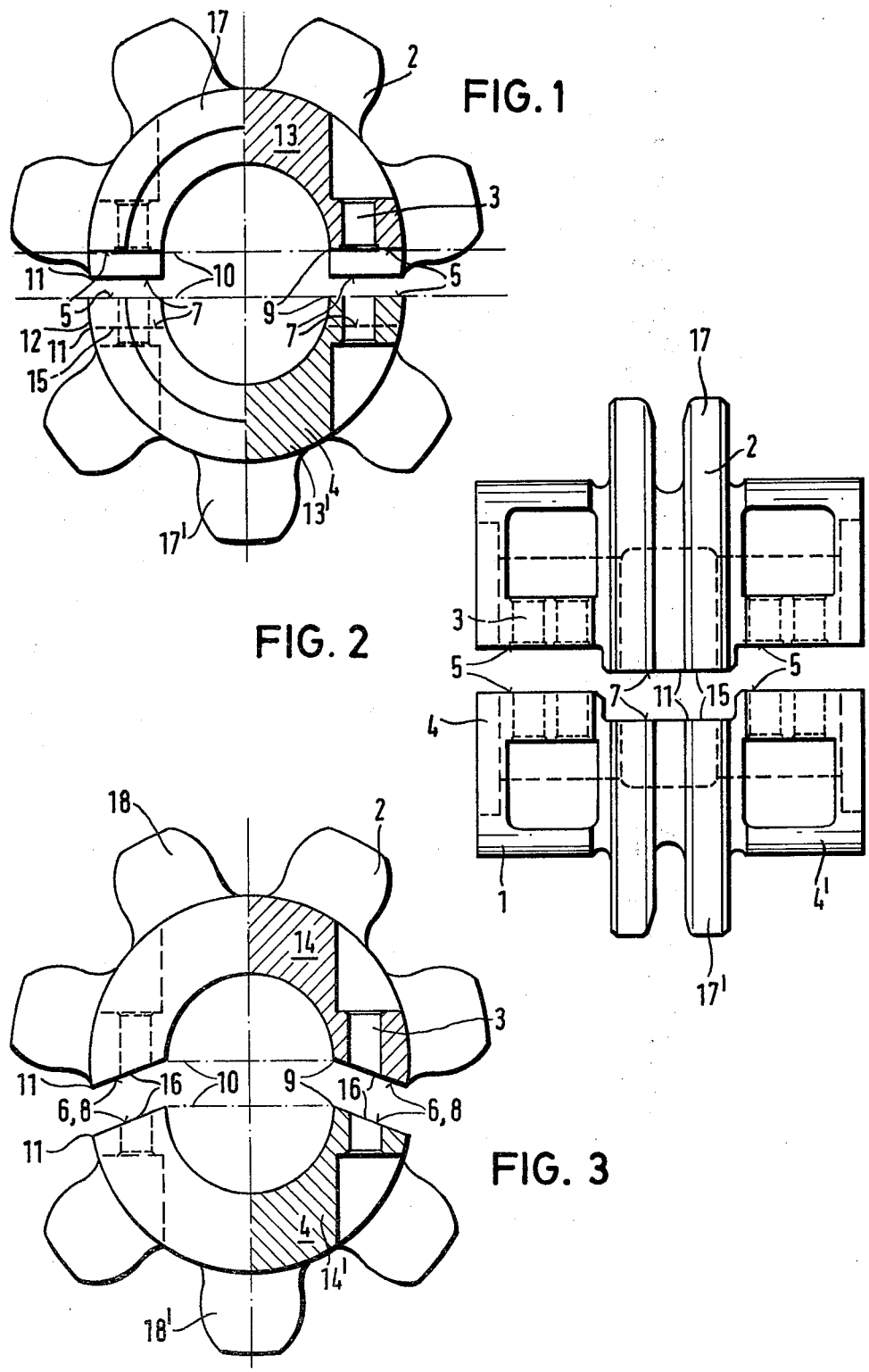

SPROCKET DRUM ASSEMBLY

BACKGROUND TO THE INVENTION

This invention relates to a sprocket drum assembly for a scraper-chain conveyor of a mineral mining installation.

The scraper bars of a scraper-chain conveyor are driven along the line of conveyor pans by means of an endless chain which passes around a pair of sprocket drum assemblies positioned in a drive frame at each end of the line. At least one of the sprocket drum assemblies is keyed to a drive shaft of a drive station, though one of them may be keyed to an idler shaft. Where the scraper bars are driven by a single centre chain, the sprocket drum assembly is constituted by a generally cylindrical, hollow drum and a sprocket wheel fixed centrally to the outer cylindrical surface thereof. Where a double centre chain is used to drive the scraper bars, there are two sprocket wheels centrally positioned on the drum. Similarly, where the scraper bars are driven by a pair of outboard chains, the drum is provided with a pair of sprocket wheels positioned one adjacent each end thereof. In all cases, the sprocket wheel or wheels may be integrally formed with their drums. Although, from now on, the specification relates to a sprocket drum assembly having a single, central sprocket wheel, it will be appreciated that the invention is equally applicable to the other two types of assembly. In order to facilitate the assembly and removal of such a sprocket drum assembly, it is known to have a two-part assembly. Such an assembly has complementary parts which can be fitted to, and removed from, the associated drive (or idler) shaft without removing the shaft from the drive frame. The two parts of such an assembly are usually bolted together, and can be removed by unfastening the bolts and then withdrawing the two assembly parts radially.

In order to maintain the strength of the teeth of the sprocket wheel, the plane of separation between the two parts of the assembly is arranged to pass between two pairs of adjacent teeth. Where the sprocket wheel has an even number of teeth, there are no problems, as the plane of separation can be a diametrical plane which passes between adjacent pairs of teeth at each end. This results in an assembly in which the two parts are identical halves. Where there are an odd number of teeth, however, there are problems, since such a diametrical plane of separation will pass through a tooth at one end thereof. In order to prevent this, a known sprocket drum assembly having an odd number of teeth (see DE-OS 2340318) has a double plane of separation. Each plane of separation passes between a respective adjacent pair of teeth and the two planes meet at the axis of rotation of the assembly. This means that one part of the assembly subtends an obtuse angle at the axis and the other part subtends a reflex angle, the sum of the two angles being 360°. Unfortunately, the larger part has a part-cylindrical inner surfaces which is larger than that of half a cylinder. Thus, in order to allow this part to be fitted to, and removed from, its shaft in a radial direction, it is necessary to cut away the inner longitudinal edges of this part along the entire length thereof. Not only does this involve considerable effort, but it also greatly reduces the area of contact between the inner cylindrical surface of that part and the shaft. Consequently, the surface pressure between that drum assembly part and the shaft is increased. This is particularly disadvantageous, as the areas of reduced contact occur at just the places where contact is most needed to counter the forces which tend to tilt the sprocket wheel (and hence the entire assembly) relative to the shaft. These disadvantages adversely affect such an assembly as regard its ability to transmit large torques or to take up radially or obliquely directed forces. Moreover, as these cut-away zones extend the entire length of the larger assembly part they interfere with the function of the seals provided at the two ends of the assembly for sealing the rotatable assembly with respect to the stationary drive frame parts in which the assembly is mounted.

The aim of the invention is to provide a two-part chain drum assembly having an odd number of sprocket teeth which does not require the inner longitudinal edges of the larger part to be cut away, at least in the regions not carrying sprocket teeth.

SUMMARY OF THE INVENTION

The present invention provides a sprocket drum assembly constituted by two complementary, radially-separable sprocket drum assembly parts, the assembly comprising a hollow, cylindrical drum and a sprocket wheel having an odd number of sprocket teeth, wherein said two parts meet along two surfaces, the inner edges of at least those portions of said surfaces associated with the drum lying in a diametrical plane of the assembly, and each of the outer edges of those portions of said surfaces associated with the sprocket wheel lying between a respective pair of sprocket teeth.

Advantageously, the sprocket wheel is positioned centrally within the assembly, the drum being constituted by a pair of drum flanges which extend axially from the opposite sides of the sprocket wheel. Preferably, said two parts are joined together by means of bolts accommodated in aligned bores in the drum flanges.

Conveniently, each of said parts is a one-piece (preferably cast) component.

In one preferred embodiment, each of said surfaces has a first component associated with the drum and a second component associated with the sprocket wheel, the first components lying in said diametrical plane of the assembly, and the second components lying in a plane parallel to, and offset from, said diametrical plane. Alternatively, each of said surfaces lies in a respective plane, the two planes being inclined to one another and meeting at a line which is parallel to, and offset from, the axis of rotation of the assembly. In both embodiments, the entire inner cylindrical surface of the drum can be used as a bearing surface for a sprocket drive (or idler) shaft. Moreover, end sealing is not affected as there are no cut-away portions. In the first of these embodiments, the offset in said surfaces offers the advantage that the two parts are interlocked in an axial direction. This feature is not present in the alternative embodiment, though this embodiment has the additional advantage of requiring no cut-away portions at all (the inner longitudinal edges of the first components of said surfaces requiring cutting away).

BRIEF DESCRIPTION OF DRAWINGS

Two forms of sprocket drive assembly, each constructed in accordance with the invention, will now be described, by way of example, with reference to the accompanying drawings, in which:

FIG. 1 is a part-sectional end elevation of the first form of assembly;

FIG. 2 is a side elevation of the first form of assembly; and

FIG. 3 is a part-sectional end elevation of the second form of assembly.

BRIEF DESCRIPTION OF PREFERRED EMBODIMENT

Referring to the drawings, FIGS. 1 and 2 show a sprocket drum assembly having a hollow, cylindrical drum 1 and a central sprocket wheel 2 which has seven teeth. The drum 1 thus constitutes a pair of cylindrical flanges 4 and 4' which extend axially from opposite sides of the sprocket wheel 2. The entire assembly is constituted by a pair of complementary parts 13 and 13' which are joined together by bolts (not shown) accommodated in aligned bores 3 in the flanges 4 and 4'. The flanges 4 and 4' of the two parts 13 and 13' have surfaces 5 which, in the assembled position in which the two parts are bolted together on a drive or idler shaft (not shown), meet in the central, longitudinally-extending, diametrical plane 10 of the assembly. However, the surfaces 7 of the two portions of the sprocket wheel 2 meet in a plane 15 which is parallel to and off-set from, this central, diametrical plane 10. Thus, the inner part-cylindrical surface of each of the drum flanges 4 and 4' of the two assembly parts 13 and 13' is semi-cylindrical so there is no need for the inner longitudinal edges of the larger part 13 to be cut away to enable radial fitting and removal of this part. Moreover, because of the off-set between the planes 10 and 15, the outer edges 11 of the surfaces 7 of the two portions of the sprocket wheel 2 lie, in each case, in a gap 12 between two adjacent teeth. Thus, only the inner longitudinal edges of the two portions of the sprocket wheel 2 need to be cut away, and consequently this drum sprocket assembly can transmit large torques, and take up radial and/or oblique forces. Moreover, there are no cut-away portions in the zones of contact between the rotatable assembly and its stationary mountings so that adequate sealing in these zones is possible.

The sprocket drum assembly of FIG. 3 is similar to that of FIGS. 1 and 2 in that it has a two-part drum 1 and a central sprocket wheel 2. Here again, the drum 1 has a pair of flanges (only one of which—flange 4—can be seen in FIG. 3) joined together, in use, by means of bolts accommodated in aligned bores 3 in the flanges of the complementary parts 14 and 14'. The flanges 4 and 4' of the two parts 14 and 14' have surfaces 6 which, in the assembled position, lie in face-to-face contact. Similarly the complementary portions of the sprocket wheel 2 have surfaces 8 which also lie in face-to-face contact in the assembled positions, each surface 8 being coplanar with the associated surface 6 to define a respective plane of separation 16. The two parts 14 and 14' are thus separated by two planes of separation 16, these two planes being inclined to one another and meeting at a line which does not coincide with the axis of rotation of the assembly. The assembly part 14 is, therefore, larger than the part 14', though its inner longitudinal edges 9 lie on the central diametrical plane 10 of the assembly. Consequently, there is no need for these edges 9 to be cut away in the region of the sprocket wheel 2 as well as in the regions of the drum flanges 4 and 4'. Moreover, because of the inclined nature of the two planes of separation 16, the outer edges 11 of these planes pass, in each case, between an adjacent pair of sprocket teeth. The embodiment of FIG. 3 thus has all the advantages of the embodiment of FIG. 1, and the additional advantage that the inner longitudinal edges of the two sprocket wheel portions also need no cutting away.

Although the sprocket wheel 2 of each embodiment could be separately formed from its drum 1. It is preferable for each sprocket wheel portion to be integral with the corresponding drum portions. Thus, in the embodiment of FIGS. 1 and 2, the sprocket wheel has two portions 17 and 17', portion 17 being an integral portion of part 13, and portion 17' being an integral portion of part 13'. Similarly, in the embodiment of FIG. 3, the sprocket wheel 2 has a portion 18 which is an integral portion of part 14, and a portion 18' which is an integral portion of part 14'. Preferably, each of the parts 13, 13', 14 and 14' is a cast component.

I claim:

1. A sprocket drum assembly, comprising: a pair of complementary, radially separable sprocket drum assembly parts, the assembly comprising a hollow cylindrical drum and a sprocket wheel having an odd number of sprocket teeth, wherein said two parts meet along two surfaces, the inner edges of at least those portions of said surfaces associated with the drum lying in a diametrical plane of the assembly, and each of the outer edges of those portions of said surfaces associated with the sprocket wheel lying between a respective pair of sprocket teeth, and wherein each of said surfaces has a first component associated with the drum and a second component associated with the sprocket wheel, the first components lying in said diametrical plane of the assembly, and the second components lying in a plane parallel to, and offset from, said diametrical plane.

2. A sprocket drum assembly, comprising: a pair of complementary, radially separable sprocket drum assembly parts, the assembly comprising a hollow cylindrical drum and a sprocket wheel having an odd number of sprocket teeth, wherein said two parts meet along two surfaces, the inner edges of at least those portions of said surfaces associated with the drum lying in a diametrical plane of the assembly, and each of the outer edges of those portions of said surfaces associated with the sprocket wheel lying between a respective pair of sprocket teeth, and wherein each of said surfaces lies in a respective plane, the two planes being inclined with respect to one another and meeting at a line which is parallel to, and offset from, the axis of rotation of the assembly.

3. An assembly according to claims 1 or 2, wherein the sprocket wheel is positioned centrally within the assembly, the drum being constituted by a pair of drum flanges which extend axially from the opposite sides of the sprocket wheel.

4. An assembly according to claim 3, wherein said two parts are joined together by means of bolts accommodated in aligned bores in the drum flanges.

5. An assembly according to claim 3, wherein each of said parts is a one-piece component.

6. An assembly according to claim 5, wherein each of said parts is a one piece cast component.

* * * * *